(12) United States Patent  
Hutchings et al.

(10) Patent No.: US 7,677,619 B2
(45) Date of Patent: Mar. 16, 2010

(54) COLLAPSIBLE REMOTE MECHANICAL GRASPER FOR HANDLING EXPLOSIVE DEVICES

(75) Inventors: Martin Hutchings, Elk Grove, CA (US); Judd Holiday, Granite Bay, CA (US)

(73) Assignee: Grabber Tech, LLC, Elk Grove, CA (US)

( * ) Notice: Subject to any disclaimer, the term of this patent is extended or adjusted under 35 U.S.C. 154(b) by 817 days.

(21) Appl. No.: 11/551,376

(22) Filed: Oct. 20, 2006

(65) Prior Publication Data

US 2007/0152457 A1 Jul. 5, 2007

Related U.S. Application Data

(60) Provisional application No. 60/729,138, filed on Oct. 21, 2005.

(51) Int. Cl.
*B25J 1/02* (2006.01)
*A47F 13/06* (2006.01)

(52) U.S. Cl. ........................................ 294/19.1; 56/333
(58) Field of Classification Search ................ 294/19.1, 294/24, 103.1; D8/51; 81/53.12; 56/333; 7/161

See application file for complete search history.

(56) References Cited

U.S. PATENT DOCUMENTS

| 4,160,563 | A | * | 7/1979 | Whitney | ..................... 294/19.1 |
|---|---|---|---|---|---|
| 4,374,600 | A | * | 2/1983 | van Zelm | ..................... 294/19.1 |
| 4,547,010 | A | * | 10/1985 | Camp | ..................... 294/50.9 |
| 5,647,622 | A | * | 7/1997 | Schectman | ..................... 294/19.1 |
| 5,823,590 | A | | 10/1998 | Forrest et al. | |
| 7,004,520 | B2 | * | 2/2006 | Khubani et al. | ..................... 294/19.1 |

\* cited by examiner

*Primary Examiner*—Paul T Chin
(74) *Attorney, Agent, or Firm*—Eckert Seamans Cherin & Mellott, LLC; David V. Radack, Esquire (57) ABSTRACT

A collapsible remote mechanical grasping apparatus that can be used to grasp explosive devices is provided. The collapsible remote mechanical grasping apparatus comprises a first rod and a second rod which are connected by a joint assembly. The collapsible remote mechanical grasping apparatus further includes a claw assembly pivotably connected to the second rod, a cable assembly mounted to the first rod, and a slidable locking sleeve assembly positioned around the first rod, the joint assembly, and the second rod. The cable assembly comprises a claw control lever and an actuation cable that is mechanically connected to the claw control lever and the claw assembly. Actuation of the claw control lever causes the actuation of the claw assembly. Additionally, the joint assembly allows the second rod to pivot towards the first rod when the slidable locking sleeve is retracted from the second rod and the joint assembly.

35 Claims, 5 Drawing Sheets

COLLAPSIBLE REMOTE MECHANICAL GRASPER FOR HANDLING EXPLOSIVE DEVICES

CROSS REFERENCE TO RELATED APPLICATIONS

This invention claims priority under 35 U.S.C. 119(e) from U.S. Provisional Application No. 60/729,138, which was filed on Oct. 21, 2005 and is incorporated by reference herein.

BACKGROUND OF THE INVENTION

1. Field of the Invention

The present invention relates generally to remote mechanical graspers, and more particularly to remote mechanical graspers for handling suspect or explosive devices. The invention provides a portable remote mechanical grasper that permits safe handling of a suspect or explosive device and that is collapsible for easy transport and storage.

2. Description of the Related Art

Bomb disposal is an extremely difficult and dangerous profession. Bomb technicians are constantly exposed to explosive devices of varying power and sophistication. Explosive devices that bomb technicians routinely address include traditional explosives as well as chemical or biological devices. Because of the clear and inherent danger in bomb disposal, various forms of protection and methods of handling explosive devices have been implemented to increase the survival rate of a bomb technician in the event of device detonation. In particular, remotely controlled vehicles have been developed to handle and transport an explosive device to a location where the device may be safely disarmed or detonated. Alternatively, an explosive device can sometimes be transferred to a containment apparatus, where it may be safely detonated or rendered inoperable. In this way, bomb technician safety is maximized by removing the bomb technician from the device blast radius.

Many explosive devices are located where it is difficult or impossible for remotely controlled vehicles to enter or navigate. Sometimes it is necessary to deal with an explosive device when no remotely controlled vehicle is available, or before a vehicle can arrive. In such cases, a bomb technician may be required to personally handle and transport an explosive device. The bomb technician will typically wear a protective bomb disposal suit to protect the bomb technician in the event of device detonation. The suits are often flame and fragmentation resistant, and may include internal communications, sound amplification, or internal cooling. While these suits offer a bomb technician some degree of protection, they tend to be heavy and bulky, and severely limit the mobility of the bomb technician.

Explosive devices may also be located where it is difficult for a bomb technician to reach, or where the bomb technician is required to navigate through a limited space access point. For example, explosive devices may be placed at a height either below or above the ordinary reach of the bomb technician, requiring the technician to either climb down or up to the level of the device. This can drastically increase the risk to the bomb technician in the event of device detonation. In addition, movement may be hampered by the weight and bulk of the protective bomb disposal suit, preventing the bomb technician entry to tight spaces. Often the bomb technician will be required to move through a limited space access point, such as an elevator, stairwell, or ladder, which may prevent the transport of certain protective gear to the explosive device.

Explosive devices can be improvised or constructed out of common materials. These devices are known as improvised explosive devices (IEDs), and are often disguised as some other object. As a result, bomb technicians are routinely required to address suspect devices which may or may not be explosive devices. For instance, IEDs are a common threat to military vehicles and personnel; such devices are easily placed along a roadway and camouflaged to look like refuse or other innocuous item. Sometimes bomb technicians are required to handle suspect devices that turn out to be non-explosive. Similarly, innocuous or non-threatening items may turn out to be explosive devices. Because remotely controlled vehicles may not be available when a bomb technician is required to assess a suspect device, or may only be available after the suspect device is identified as an explosive device, the bomb technician must often personally handle and transport the device. Personnel at the scene of a suspect device may not have access to protective bomb disposal suits, as in the context of a routine military patrol. Police and emergency response personnel who arrive during or after a terrorist attack may not have the capability or time to transport protective gear and equipment to the scene. In such cases, responders may be required to personally handle and transport a terrorist device to quickly secure an area.

Mechanical graspers have been previously used to aid individuals in grasping objects that are otherwise outside their reach. Such graspers have been used, for instance, to aid immobilized individuals or individuals confined to wheel chairs to access counters, cabinets, or objects on the floor. Graspers have also been used to aid individuals in placing and removing decorations without the need for a ladder. U.S. Pat. No. 5,823,590 to Forrest et al. discloses a telescoping grabber pole to hang and retrieve ornamentation or other items; however, the telescoping grabber pole requires the operator to manipulate the grabber by pulling and tying off a cord. This makes use of the telescoping grabber pole cumbersome, as the operator must hold on to the fully extended pole of 24 feet with one hand while the other hand manipulates the cord. The user must then tie off the cord once the grabber has been actuated in order to use both hands again to manipulate the extended pole. Operation of a telescoping grabber pole like the Forrest apparatus would be prohibitively difficult and dangerous for a bomb technician in a protective bomb disposal suit. Explosive devices are often fragile devices which must be handled with the utmost care and precision to prevent premature detonation. Traditional mechanical graspers are unsuitable for bomb disposal for a variety of other reasons. For example, most explosive devices are extremely susceptible to static discharge. Traditional mechanical graspers, such as the Forrest et al. telescoping grabber pole, do not have protection against static charge buildup or static discharge and thus are not suitable for use in handling explosive devices.

Studies have shown that each foot of distance between a bomb technician and a device explosion substantially increases the survival rate of the technician. Accordingly, it would be desirable to provide an apparatus that permits a bomb technician to remotely handle and transport a suspect or explosive device, and that increases the survival rate of the bomb technician in the event of a device detonation by allowing the bomb technician to address the device from a distance. It would be further desirable to provide an apparatus that is easily operated by a bomb technician wearing a protective bomb disposal suit, and which permits the bomb technician to handle and transport a suspect or explosive device that is in a difficult position to access or reach. It would also be desirable to provide an apparatus that is insulated from static charge build-up or static discharge, and which may be precisely manipulated to prevent inadvertent detonation of a fragile explosive device. Additionally, it would be desirable to provide an apparatus that is easy to store and to deploy, and which can be quickly transported to an IED or suspect device for immediate response, or where a remotely controlled vehicle or containment apparatus may not be available.

SUMMARY OF THE INVENTION

This need, and others, is met by embodiments of this invention which provide a collapsible remote mechanical grasping apparatus that can be used to grasp (handle) explosive devices having various shapes and sizes.

In accordance with one embodiment of the invention, a remote mechanical grasping apparatus comprising a first rod, a second rod, and a joint assembly. Each of the first and second rods has a first end and a second end. The joint assembly is connected to the second end of the first rod and to the first end of the second rod. The remote mechanical grasping apparatus further includes a claw assembly pivotably connected to the second end of the second rod, and a cable assembly mounted substantially adjacent to the first end of the first rod. The cable assembly comprises a claw control lever and an actuation cable that is mechanically connected to the claw control lever and the claw assembly. Actuation of the claw control lever causes the actuation of the claw assembly. The remote mechanical grasping apparatus also includes a slidable locking sleeve assembly positioned around the first rod, the second rod, and the joint assembly. It is noted that the joint assembly allows the second rod to pivot towards the first rod when the slidable locking sleeve is retracted from the second rod and the joint assembly.

In accordance with another embodiment of the invention, a remote mechanical grasping apparatus comprising a first rod, a second rod, and a joint assembly. Each of the first and second rods has a first end, a second end, and an interior channel extending therethrough. The joint assembly comprises a first joint fitting, a joint rod, and a second joint fitting each having a first end and a second end. The first end of the first joint fitting is connected to the second end of the first rod. The first end of the joint rod is connected to the second end of the first joint fitting. The first end of the second joint fitting is connected to the second end of the joint rod while the second end of the second joint fitting is connected to the first end of the second rod. An interior channel, which is in communication with the interior channel of the first and second rods, extends through the joint assembly. The remote mechanical grasping apparatus further includes a claw assembly pivotably connected to the second end of the second rod, and a cable assembly mounted substantially adjacent to the first end of the first rod. The cable assembly comprises a claw control lever and an actuation cable that extends through the interior cavity of each of the first rod, the joint assembly, and the second rod. The actuation cable is mechanically connected to the claw control lever and the claw assembly such that actuation of the claw control lever causes the actuation of the claw assembly. The remote mechanical grasping apparatus also includes a slidable locking sleeve assembly positioned around the first rod, the second rod, and the joint assembly. As stated above, the joint assembly allows the second rod to pivot towards the first rod when the slidable locking sleeve is retracted from the second rod and the joint assembly.

In accordance with another embodiment of the invention, a method for deploying a remote mechanical grasping apparatus comprising providing the remote mechanical grasping apparatus. The remote mechanical grasping apparatus comprises a first rod, a second rod, and a joint assembly. Each of the first and second rods has a first end and a second end. Additionally, the second rod is positioned substantially parallel to the first rod. The joint assembly is connected to the second end of the first rod and to the first end of the second rod. The remote mechanical grasping apparatus further includes a claw assembly pivotably connected to the second end of the second rod, and a cable assembly mounted substantially adjacent to the first end of the first rod. The cable assembly comprises a claw control lever and an actuation cable that is mechanically connected to the claw control lever and the claw assembly. Actuation of the claw control lever causes the actuation of the claw assembly. The remote mechanical grasping apparatus also includes a slidable locking sleeve slidably coupled to the first rod. The slidable locking sleeve comprises a locking sleeve having a threaded first end and a compression clamp having a threaded interior that is adapted to engage with the threaded first end of the locking sleeve. The compression clamp is positioned between the locking sleeve and the first end of the first rod. The method further comprises pivoting the second rod until the second rod is substantially coaxial with the first rod, sliding the locking sleeve over the joint assembly and the second rod such that the locking sleeve is positioned around the first rod, the joint assembly, and the second rod, and engaging the compression clamp with the locking sleeve thereby locking the first rod to the second rod.

One objective of the present invention is to increase the survival rate of an operator by increasing the stand-off distance between the operator and a suspect or explosive device.

Another objective of the present invention is to provide a remote mechanical bomb handling apparatus that is easily deployed or collapsed by a single operator, even if the operator is wearing a protective bomb disposal suit.

Another objective of the present invention is to provide a remote mechanical bomb handling apparatus that can be rapidly deployed or collapsed by a single operator, even if the operator is wearing a protective bomb disposal suit.

Another objective of the present invention is to provide a remote mechanical bomb handling apparatus that is easily operated by a single operator, even if the operator is wearing a protective bomb disposal suit.

Another objective of the present invention is to provide a remote mechanical bomb handling apparatus that is easily repaired in the field.

Another objective of the present invention is to provide a remote mechanical bomb handling apparatus that is easily and conveniently stored in a collapsed state.

Another objective of the present invention is to provide a remote mechanical bomb handling apparatus that reduces the number of exterior control lines and wires to prevent the apparatus from being snagged.

Another objective of the present invention is to provide a remote mechanical bomb handling apparatus that includes a joint feed-through that allows for an interior control line even in a collapsed state.

Another objective of the present invention is to provide a remote mechanical bomb handling apparatus that includes a lever actuation for the claw assembly that permits an operator a better control over the grip of the claw.

Another objective of the present invention is to provide a remote mechanical bomb handling apparatus that includes a locking switch for the lever actuation to lock the claw assembly at a specific grip strength.

Yet another objective of the present invention is to provide a remote mechanical bomb handling apparatus that includes a claw assembly that is constructed of a non-conductive material to reduce potential static charge build-up.

Yet another objective of the present invention is to provide a remote mechanical bomb handling apparatus that includes a claw assembly that is coated with a non-sparking material to reduce potential static discharge.

Yet another objective of the present invention is to provide a remote mechanical bomb handling apparatus that includes claw fingers that are coated with a non-conductive elastic grip to add grip strength and reduce potential static discharge.

Yet another objective of the present invention is to provide a remote mechanical bomb handling apparatus that includes a radius of curvature of the claw fingers that is adapted to grasp common cylindrical improvised explosive devices, such as pipe bombs.

Yet another objective of the present invention is to provide a remote mechanical bomb handling apparatus that includes a hand shield that protects an operator from a premature device detonation.

Yet another objective of the present invention is to provide a remote mechanical bomb handling apparatus that includes a flashlight to facilitate handling and transport of a suspect or explosive device in dark or dimly lit conditions while keeping the operator's hands free.

BRIEF DESCRIPTION OF THE DRAWINGS

A full understanding of the disclosed and claimed concept can be gained from the following Description when read in conjunction with the accompanying drawings in which:

DESCRIPTION OF THE PREFERRED EMBODIMENTS

As employed herein, the term "mechanical fastener" or variations thereof shall refer broadly to any suitable fastening, connecting or tightening mechanism including, but limited to, screws, bolts, and the combination of bolts and nuts.

As employed herein, the term "number" means one or an integer greater than one (i.e., a plurality).

When referring to any numerical range of values, such ranges are understood to include each and every number and/or fraction between the stated range minimum and maximum.

Directional phrases used herein, such as, for example, upper, lower, left, right, vertical, horizontal, top, bottom, above, beneath, clockwise, counterclockwise and derivatives thereof, relate to the orientation of the elements shown in the drawings and are not limiting upon the claims unless expressly recited therein.

Figure 1A:
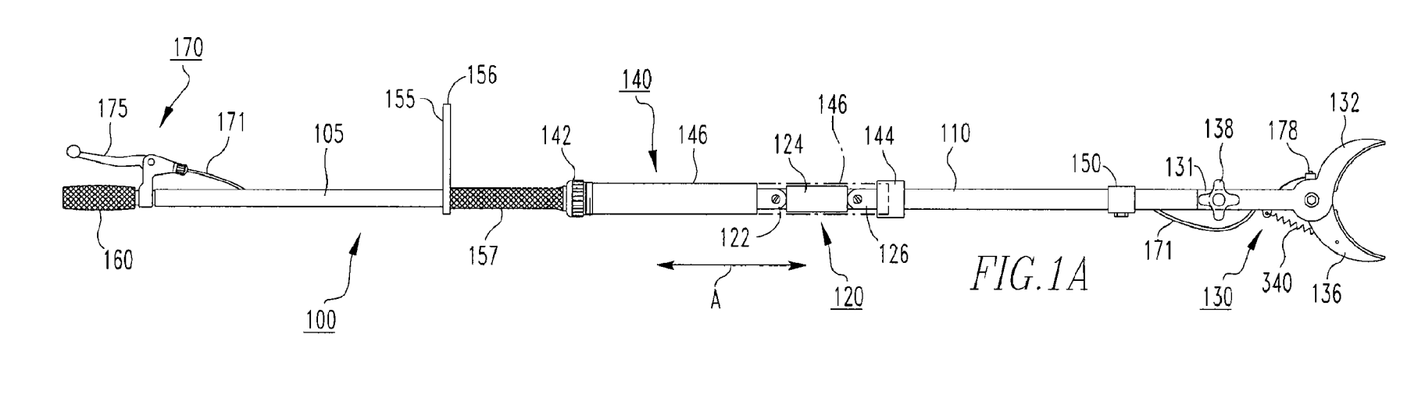
FIG. 1A is a side elevation view of a remote mechanical bomb handling apparatus in a deployed and unlocked state, according to one embodiment of the present invention.
Figure 1B:
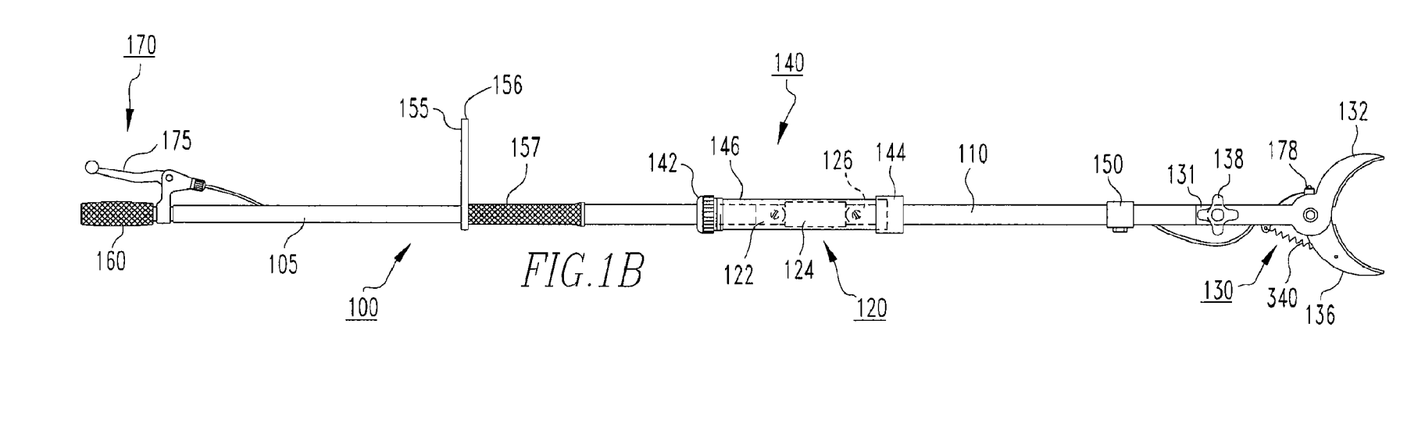
FIG. 1B is a side elevation view of the remote mechanical bomb handling apparatus depicted in FIG. 1A in a deployed and locked state.

A remote mechanical grasping apparatus according to one embodiment of the present invention is depicted in FIGS. 1A and 1B. Apparatus 100 comprises a first rod 105 and a second rod 110. First rod 105 and second rod 110 each have an interior channel that runs the length of the rod. One end of first rod 105 is pivotably coupled to one end of second rod 110 by a joint assembly 120. In one embodiment, first rod 105 is approximately 137.16 centimeters (4.5 feet) in length and second rod 110 is approximately 82.29 centimeters (2.7 feet) in length. However, it is to be appreciated that in other embodiments the length of first and second rods 105 and 110 may be varied to produce an apparatus with a longer or shorter range. First rod 105 and second rod 110 are constructed of aluminum, but may be constructed of another material capable of supporting the weight of apparatus 100 in its deployed state, including cargo. By way of non-limiting example, first rod 105 and second rod 110 might alternatively be constructed of another metal or alloy, or may be constructed of a non-conductive material such as a polymer, plastic or other suitable material. It is envisioned that the cross-sections of the rods be cylindrical, but the rods may have a different cross-section including, but not limited to, rectangular or polygonal cross-sections.

The joint assembly 120 comprise two hinge joints that allow first rod 105 and second rod 110 to pivot in the same plane, permitting apparatus 100 to be folded in half. In other embodiments the joint assembly can be adapted to pivot in different planes, for example, by providing a locking joint. Joint assembly 120 also comprises an interior channel that is in communication with the interior channels of first rod 105 and second rod 110.

A locking sleeve assembly 140 is coupled to first rod 105 and second rod 110 adjacent to joint assembly 120. Locking sleeve assembly 140 is adapted to lock apparatus 100 in a deployed state by sliding over first rod 105, joint assembly 120, and second rod 110 (see Arrow A) to render joint assembly 120 substantially or completely immobile. Thus, locking sleeve assembly 140 maintains the apparatus in a deployed state. Locking sleeve assembly 140 may also be retracted (see Arrow A), permitting apparatus 100 to be folded in half.

A cable assembly 170 is coupled to the end of first rod 105, opposite the end coupled to joint assembly 120. Cable assembly 170 comprises a claw control lever 175 fixably coupled to first rod 105. An actuation cable 171 is attached at one end to claw control lever 175. Actuation cable 171 is then threaded into the interior channel of first rod 105 near claw control lever 175. Actuation cable 171 is subsequently threaded through the interior channels of first rod 105, joint assembly 120, and second rod 110. Actuation cable 171 emerges from second rod 110 near a claw assembly 130. The far end of actuation cable 171 is attached to claw assembly 130 so as to permit actuation of the claw using claw control lever 175.

Claw assembly 130 is pivotably coupled to the end of second rod 110, opposite the end coupled to joint assembly 120. Claw assembly 130 can be pivoted with respect to second rod 110 to a desired orientation and locked into position by a locking mechanism 138. Claw assembly 130 is pivotable in the same plane as joint assembly 120. In another embodiment, Claw assembly 130 is pivotable in different planes than joint assembly 120. The claw assembly also comprises a bottom claw 132 and a top claw 136. Top claw 136 is moveably coupled to bottom claw 132 and is adapted to move toward bottom claw 132 when claw control lever 175 is actuated.

The construction of the various assemblies will now be described in further detail. Referring to FIGS. 1A and 1B, joint assembly 120 is cylindrical in shape and comprises three sections: a first joint fitting 122, a joint rod 124, and a second joint fitting 126. Joint assembly 120 is constructed of aluminum, but can be constructed from another metal or alloy, polymer, plastic, or other suitable material, by way of non-limiting example. First joint fitting 122 is coupled to first rod 105 by partially fitting into the interior channel of the rod, and is secured by any conventional means known in the art. For instance, first joint fitting 122 may be threaded to mate with the interior of first rod 105, which is similarly threaded. Other methods of attachment include, but are not limited to, screws, rivets, compression, welding, adhesive or epoxy. First joint fitting 122 is pivotably coupled to joint rod 124 to form a hinge joint, allowing first rod 105 to pivot with respect to joint rod 124. Joint rod 124 is also pivotably coupled to second joint fitting 126 at the end opposite to first joint fitting 122. Second joint fitting 126 is coupled to second rod 110 by partially fitting into the interior channel of the rod, and is secured in a manner similar to first joint fitting 122.

The interior channel of joint assembly 120 runs the length of the joint assembly, including first joint fitting 122, joint rod 124, and second joint fitting 126. The interior channels of first rod 105 and second rod 110 can be larger than the interior channels of joint assembly 120 to accommodate coupling of first joint fitting 122 and second joint fitting 126, respectively. The interior channel of first joint fitting 122 is in communication with both the interior channel of first rod 105 and the interior channel of joint rod 124, which in turn is in communication with the interior channel of second joint fitting 126, which is in communication with the interior channel of second rod 110. The interior channel of joint assembly 120 is in communication with the interior channels of first rod 105 and second rod 110 including when joint rod 124 is pivoted with respect to first rod 105 or second rod 110. In this manner, actuation cable 171 may remain threaded through first and second rods 105 and 110 and joint assembly 120 when apparatus 100 is in either a deployed or collapsed state. Threading actuation cable 171 through the interior channel advantageously eliminates stray control wires from the exterior of apparatus 100, reducing the possibility of catching or snagging wires on obstacles in the environment while transporting or operating the apparatus. In addition, threading actuation cable 171 through the interior channel of the joint assembly simplifies the process of transforming apparatus 100 from a deployed state to a collapsed state, and vice versa, as the operator need not worry about catching stray wires on other components of the apparatus.

Figure 2:
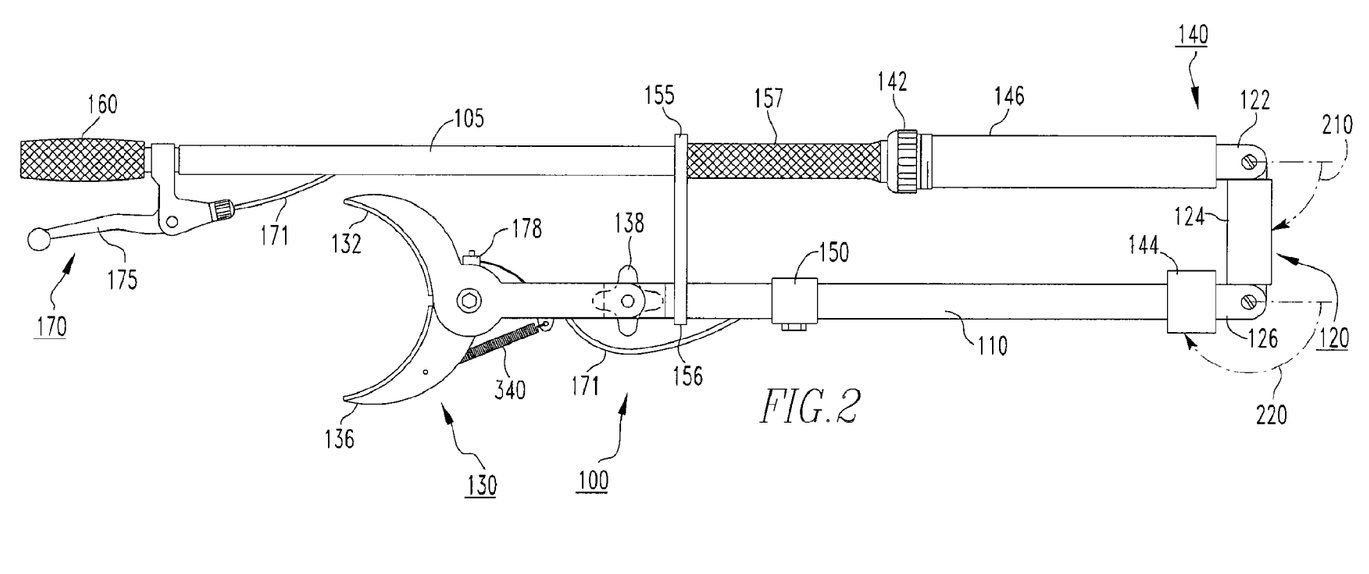
FIG. 2 is a side elevation view of the remote mechanical bomb handling device in a collapsed state, according to an embodiment of the present invention.

FIG. 2 depicts apparatus 100 in a collapsed state. From FIG. 2 it can be seen that a first joint angle 210 is formed between first rod 105 and joint rod 124, relative to the longitudinal axis of first rod 105. According to one embodiment of the present invention, first joint angle 210 may be varied between approximately 0 degrees and 90 degrees, the latter angle indicating that the apparatus is in a partially folded state. Similarly, a second joint angle 220 is formed between second rod 110 and joint rod 124, relative to the longitudinal axis of second rod 110. Second joint angle 220 may be varied between approximately 0 degrees and 90 degrees, the latter angle indicating that the apparatus is in a partially folded state. In a preferred embodiment of the present invention, first and second joint angles 210 and 220 are limited to between approximately 0 degrees and 90 degrees. This advantageously prevents potential damage to actuation cable 171 which may result from folding apparatus 100 in a direction opposite from its stored direction. However, in an alternate embodiment, first joint angle 210 and second joint angle 220 may each be varied between approximately −90 degrees and 90 degrees. As is shown in FIG. 2, when both first joint angle 210 and second joint angle 220 are at 90 degrees, apparatus 100 is in a folded or collapsed state. A latch 155 can be used to secure the apparatus in a collapsed state for transport or storage. In one embodiment of the invention, the second rod 110 can only pivot towards the top 156 of the latch 155. Joint assembly 120 reduces the number of steps an operator must perform to transform the apparatus, speeding transformation of the apparatus between a collapsed and deployed state. Collapsibility of apparatus 100 is advantageous because in a collapsed state apparatus 100 can be easily transported by a single bomb technician, and by a bomb technician wearing a protective bomb disposal suit. In addition, in a collapsed state apparatus 100 will fit into limited space access points such as elevators, stairwells, ladders, narrow entry points, and the like, that it would otherwise not fit into when in a deployed state. When collapsed, apparatus 100 is easily stored, such as in the trunk or passenger compartment of a police or military vehicle.

Referring back to FIGS. 1A and 1B, locking sleeve assembly 140 comprises a compression clamp 142 coupled to a locking sleeve 146 which is slidably coupled to first rod 105. Specifically, the locking sleeve 146 has a threaded first end to which the compression clamp 142, which as a threaded interior that is adapted to engage with the threaded first end of the locking sleeve 146, is coupled. Locking sleeve 146 is adapted to freely slide over first rod 105, joint assembly 120, and second rod 110 when compression clamp 142 is disengaged and apparatus 100 is in a deployed state. Locking sleeve assembly 140 also comprises a retaining sleeve 144 which is fixably coupled to second rod 110 and prevents locking sleeve 146 from sliding along the entire length of second rod 110. In an alternate embodiment, compression clamp 142 may be slidably coupled to first rod 105 separately from locking sleeve 146. Locking sleeve 146 is constructed of aluminum, but may be constructed of another material capable of supporting the weight of apparatus 100 in its deployed state. For example, locking sleeve 146 may be constructed of a metal or alloy, polymer, plastic or other suitable material, by way of non-limiting example. In addition, it is envisioned that the cross-section of locking sleeve 146 is cylindrical so that it may freely slide over first rod 105, joint assembly 120, and second rod 110. However, locking sleeve 146 may be of a different cross-section provided that it can freely slide over the first and second rods and the joint assembly. Retaining sleeve 144 and compression clamp 142 are matched to the size and shape of locking sleeve 146, and can be purchased from a variety of commercial industrial manufacturers and suppliers.

FIG. 1A depicts apparatus 100 in a deployed but unlocked state, wherein locking sleeve 146 is retracted. In contrast, FIG. 1B depicts apparatus 100 in a deployed and locked state, wherein locking sleeve extends over first rod 105, joint assembly 120, and second rod 110. Referring to FIG. 1B, compression clamp 142 secures the locking sleeve in the locked state by clamping locking sleeve 146 firmly between compression clamp 142 and retaining sleeve 144. When locking sleeve assembly 140 is in the locked state joint assembly 120 is rendered substantially or completely immobile. Deployment of apparatus 100 is thus a two-step process, wherein the apparatus is first unfolded and then the locking sleeve assembly is locked Operation of the locking sleeve assembly is simple, and a single operator can rapidly transform apparatus 100 from a collapsed state to a deployed state, and vice versa. Simple and fast operation of the locking sleeve assembly is advantageous as it allows a bomb technician whose mobility is limited (i.e., from wearing a protective bomb suit) to easily and quickly transform the apparatus when a suspect or explosive device is encountered. In addition, apparatus 100 may be easily and quickly transformed back to a collapsed state allowing a bomb technician to rapidly enter a limited space access point, to quickly reposition himself, or to move to another suspect or explosive device.

Figure 3A:
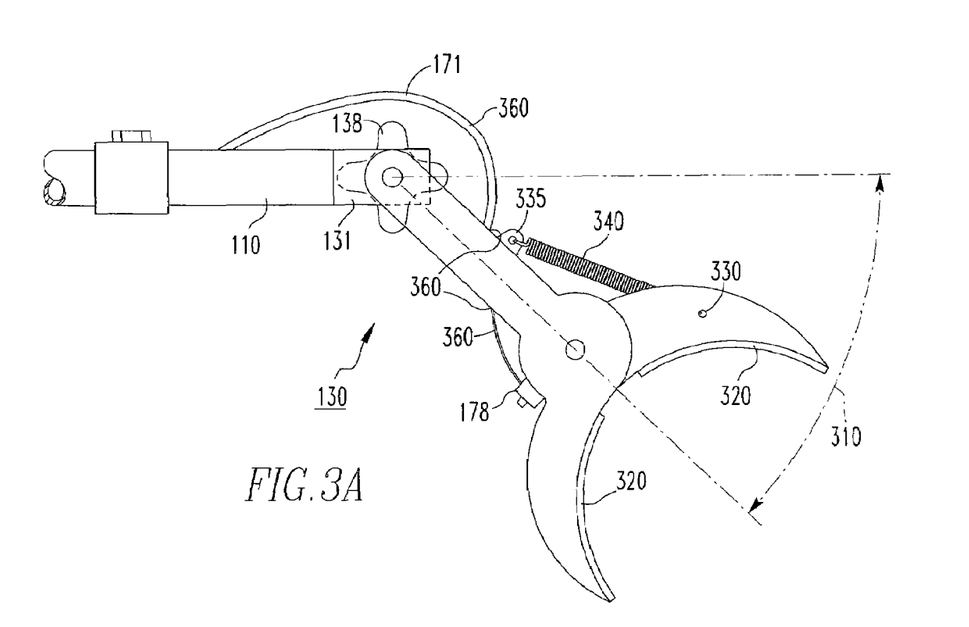
FIG. 3A is a side elevation view of the claw assembly of a remote mechanical bomb handling apparatus in an open position, according to an embodiment of the present invention.
Figure 3B:
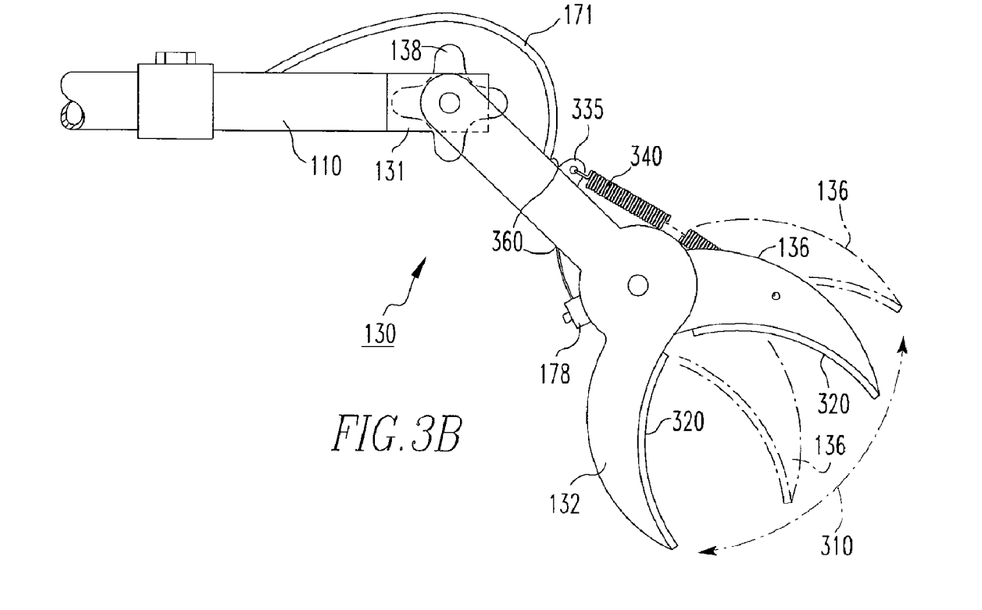
FIG. 3B is a side elevation view of the claw assembly depicted in FIG. 3A in a closed position.
Figure 4:
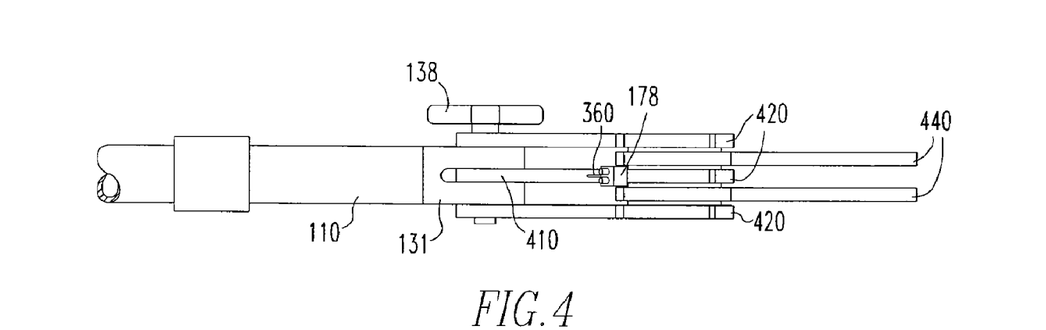
FIG. 4 is a bottom plan view of the claw assembly depicted in FIG. 3A illustrating the arrangement of claw fingers.

Claw assembly 130 comprises a claw head 131 that is coupled to second rod 110 opposite the end coupled to joint assembly 120. Claw head 131 is coupled to second rod 110 by partially fitting into the interior channel of the rod, and is secured by any conventional means known in the art. For instance, claw head 131 may be cylindrical and threaded to mate with the interior of second rod 110, which is similarly threaded. Other methods of attachment include, but are not limited to, screws, rivets, compression, welding, adhesive or epoxy. Referring to FIG. 4, bottom claw 132 comprises three bottom claw fingers 420 pivotably coupled to claw head 131. Claw head 131 has a central notch 410 to accommodate a bottom claw finger. Bottom claw fingers 420 are interlaced and coupled to claw bead 131 using locking mechanism 138. Referring now to FIGS. 3A and 3B, it can be seen that a claw angle 310 is formed between claw head 131 and bottom claw 132. Claw angle 310 may be operatively varied to a desired angle to facilitate handling and transport of a suspect or explosive device. Claw angle 310 is preferably variable between at least −90 degrees to 90 degrees relative to the longitudinal axis of the claw head 131. Locking mechanism 138 comprises a knob which allows an operator to lock the claw angle at desired angle by tightening the knob. Locking mechanism 138 can be purchased from a variety of commercial industrial manufacturers and suppliers. Adjusting the claw angle advantageously allows a bomb technician to access suspect or explosive devices in otherwise inaccessible or difficult to reach positions, including but not limited to eaves, small alcoves, gutters, and the like. In addition, adjusting the angle of the claw assembly can permit a bomb technician to address a suspect or explosive device at a different level or height without physically having to climb to the same level as the device. This increases the survival rate of the bomb technician by further removing the technician from the device blast radius.

Referring to FIG. 4, top claw 136 comprises two top claw fingers 440 that are pivotably coupled to bottom claw 132. Top claw fingers 440 are interlaced with bottom claw fingers 420 and adapted so as to move toward bottom claw 132 when claw control lever 175 is actuated. As depicted in FIGS. 3A and 3B, a first spring attachment point 330 is coupled between top claw fingers 440, and a second spring attachment point 335 is fixably coupled to the middle bottom claw finger at the end opposite the tip of the finger. Second spring attachment point 335 may alternately be formed into the middle bottom claw finger during fabrication. Bias spring 340 is attached between the top and bottom claws such that top claw 136 is biased away from bottom claw 132, and so that claw assembly 130 is biased in an open position. FIG. 3A depicts the claw assembly in an open position. A cable block 178 is fixably coupled to top claw 136 at the end opposite the tip of the fingers. Actuation cable 171 is attached to cable block 178 such that actuation of cable assembly 170 exerts a counterforce to bias spring 340 and causes claw assembly 130 to move to a closed position. FIG. 3B depicts the claw assembly in a closed position. It is to be appreciated that the arrangement of the bias spring and cable block could be reversed, so as to provide a claw assembly which is biased in a closed position and wherein actuation of the cable assembly causes the claw assembly to move to an open position. Biasing claw assembly 130 in an open position allows the operator of apparatus 100 to use cable assembly 170 to more easily control the gripping force of the claw assembly when the claw is in a closed position. Bottom claw 132 and top claw 136 additionally comprise finger grips 320 which are coupled to the inside of the claw fingers to improve the grip of the claw assembly. Top claw 136 and bottom claw 132 are constructed so that the radius of the inside curvature of the top and bottom claws, seen clearly in FIGS. 3A and 3B, is particularly adapted to grasp common cylindrical improvised explosive devices, such as pipe bombs. This is advantageous as it permits a bomb technician to gently and securely grasp a fragile suspect or explosive device, reducing the chance of premature detonation.

Claw assembly 130, including claw head 131, top claw 136, and bottom claw 132, is constructed of a non-conductive polymer, but may be constructed of another non-conductive material, such as a plastic or a phenalic, or other similar material, by way of non-limiting example. Construction of claw assembly 130 using non-conductive materials reduces the possibility of static charge build-up in apparatus 100. In addition, claw assembly 130 is coated with a non-sparking material, such as a rubber or latex coating, to reduce the possibility of static discharge. Finger grips 320 are preferably constructed from a rubber based material, but may be constructed from another non-conductive elastic material. The claw assembly is designed and constructed to improve the survival rate of bomb technician by minimizing the possibility of static charge build-up or static discharge which may cause an explosive device to prematurely detonate.

Actuation cable 171 comprises a flexible steel cable housed in a protective sheath, such as nylon, by way of non limiting example. The steel cable may alternatively be constructed of another material of suitable strength and flexibility. In addition to being threaded through the interior of first rod 105, joint assembly 120, and second rod 110, actuation cable 171 is threaded through the middle bottom claw finger at apertures 360, as can be seen in FIGS. 3A and 3B. Actuation cable 171 is then attached to cable block 178. Threading actuation cable 171 through the middle bottom claw finger advantageously reduces the number of exterior control wires in claw assembly 130, reducing the possibility of catching a stray wire on a suspect or explosive device, an obstacle in the environment, or on the claw assembly during actuation.

Apparatus 100 additionally comprises a handle 160 coupled to one end of first rod 105, shown in FIGS. 1A and 1B, to facilitate operation of claw control lever 175. Handle 160 is constructed of cylindrical aluminum, or other suitable material, having an outer diameter slightly smaller than the inside diameter of first rod 105. The handle 160 is coupled to the end of first rod 105 opposite the end coupled to joint assembly 120 by partially fitting into the interior channel of first rod 105, and is secured by any conventional means known in the art. For instance, a portion of the exterior of handle 160 may be threaded to mate with the interior of first rod 105, which is similarly threaded. Other methods of attachment include, but are not limited to, screws, rivets, compression, welding, adhesive or epoxy. Handle 160 is covered with a grip material, such as a grip material made from foam, to improve the bomb technician's control of apparatus 100. Alternatively, first rod 105 may be extended to include handle 160 by covering the end of first rod 105 with a similar grip material. In this way, a portion of first rod 105 may additionally function as a handle without the need for handle 160.

A second handle 157 is provided adjacent to latch 155 so that an operator may use both hands to operate apparatus 100. Second handle 157 is covered with a grip material, such as a grip material made from foam, to improve the operator's control of the apparatus. Second handle 157 can also serve as a stop for the locking sleeve assembly, preventing locking sleeve 146 and compression lump 142 from sliding along the entire length of first rod 105.

Figure 5:
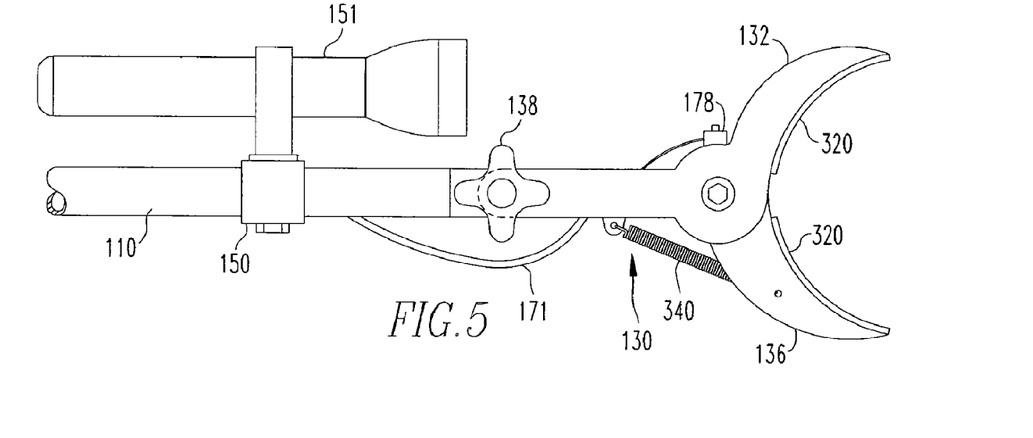
FIG. 5 is a side elevation schematic view of an embodiment of the remote mechanical bomb handling apparatus which includes a flashlight.
Figure 6:
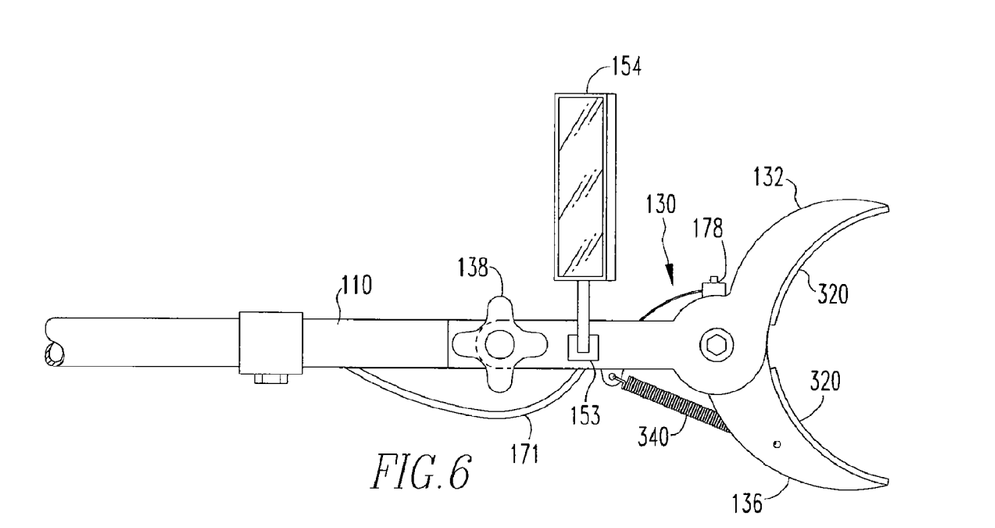
FIG. 6 is a side elevation schematic view of an embodiment of the remote mechanical bomb handling apparatus which includes a mirror.

In one embodiment of the present invention, apparatus 100 can also include a flashlight or mirror to assist an operator in handling and transporting a suspect or explosive device by allowing the operator to use both hands to operate the apparatus. This is particularly important for manipulation of fragile devices. Flashlight attachment 150 is fixably coupled to second rod 110 and is preferably adapted to accommodate a rechargeable flashlight 151 (see FIG. 5). The flashlight attachment 150 may also provide a means for positioning the beam of the flashlight 151, so that the operator may illuminate the claw assembly or other area as required. The mirror attachment 153 can be removably or fixably coupled to the second rod 110 or the claw assembly 130 and is preferably adapted to accommodate a mirror 154 (see FIG. 6).

In another embodiment of the present invention, apparatus 100 can include a hand shield to protect an operator in the event of an explosive device detonation. The hand shield (not shown) can be attached to first rod 105 or second rod 110, and may be detachable to facilitate transformation of the apparatus from a deployed to a collapsed state. The presence of a hand shield advantageously reduces the blast force and any shrapnel which may be directed toward the bomb technician.

In operation, claw control lever 175 is operated by squeezing the lever toward first rod 105. Squeezing claw control lever 175 actuates actuation cable 171, opposing the force of bias spring 340 and causing top claw 136 to move towards bottom claw 132. This causes the claw assembly to move from an open position to a closed position. Partially squeezing claw control lever 175 causes the claw assembly to move to a partially closed position. In one embodiment of the present invention, the attachment of actuation cable 171 to claw control lever 175 can be adjusted by the operator to change the tension in the cable, so that the claw control lever may be squeezed more or less to achieve a desired claw actuation according to the preference of the operator. In another embodiment, claw control lever 175 comprises a locking switch that is used to lock claw control lever 175 at a specific actuation point. Locking the claw control lever at a specific actuation point reduces the possibility of inadvertently releasing a suspect or explosive device grasped in the claw assembly should the operator's hand slip from control claw control lever 175. The locking switch can be a thumb activated switch, by way of non-limiting example, that is located on the base of the claw control lever 175

While specific embodiments of the invention have been described in detail above, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A remote mechanical grasping apparatus comprising:
    a first rod having a first end and a second end;
    a second rod having a first end and a second end;
    a joint assembly connected to said second end of said first rod and to said first end of said second rod;
    a claw assembly pivotably connected to said second end of said second rod;
    a cable assembly mounted substantially adjacent to said first end of said first rod, said cable assembly comprising:
        a claw control lever; and
        an actuation cable, said actuation cable mechanically connected to said claw control lever and said claw assembly, actuation of said claw control lever causes the actuation of said claw assembly; and
    a slidable locking sleeve assembly positioned around said first rod, said second rod, and said joint assembly;
    whereby said joint assembly allows said second rod to pivot towards said first rod when said slidable locking sleeve assembly is retracted from said second rod and said joint assembly.

2. The remote mechanical grasping apparatus according to claim 1, wherein each of said first rod, said second rod, and said joint assembly has an interior channel, said interior channel of said joint assembly is in communication with said interior channel of said first rod and said interior channel of said second rod.

3. The remote mechanical grasping apparatus according to claim 2, wherein said joint assembly comprises:
    a first joint fitting having a first end and a second end, said first end of said first joint fitting connected to said second end of said first rod;
    a joint rod having a first end and a second end, said first end of said joint rod connected to said second end of said first joint fitting; and
    a second joint fitting having a first end and a second end, said first end of said second joint fitting connected to said second end of said joint rod and said second end of said second joint fitting connected to said first end of said second rod.

4. The remote mechanical grasping apparatus according to claim 3, wherein said first end of said first joint fitting is positioned within said interior channel of said first rod and said second end of said second joint fitting is positioned within said interior channel of said second rod.

5. The remote mechanical grasping apparatus according to claim 2, wherein said actuation cable extends through said interior cavity of each of said first rod, said joint assembly, and said second rod.

6. The remote mechanical grasping apparatus according to claim 2, further comprising a handle connected to said first end of said first rod.

7. The remote mechanical grasping apparatus according to claim 6, wherein a portion of said handle is received into said interior channel of said first rod.

8. The remote mechanical grasping apparatus according to claim 7, wherein said handle has an outer surface, disposed on said outer surface is a gripping material made from foam.

9. The remote mechanical grasping apparatus according to claim 1, further comprising a latch connected to said first rod, said latch being adapted to receive said second rod when said ridable locking sleeve assembly is retracted from said second rod and said joint assembly, and said second rod is positioned substantially parallel to said first rod.

10. The remote mechanical grasping apparatus according to claim 9, wherein said first rod has an outer surface, said remote mechanical grasping apparatus further comprising a second handle disposed on said outer surface of said first rod substantially adjacent to said latch, said second handle being made from a foam gripping material.

11. The remote mechanical grasping apparatus according to claim 1, wherein said claw assembly comprises a first portion pivotably connected to a second portion, whereby actuation of said claw control lever causes said first portion to pivot towards said second portion.

12. The remote mechanical grasping apparatus according to claim 11, wherein each of said first and second portions comprises a plurality of claw members.

13. The remote mechanical grasping apparatus according to claim 12, wherein each of said plurality of claw members has an interior surface, disposed on said interior surface is a finger grip.

14. The remote mechanical grasping apparatus according to claim 13, wherein said finger grip is made form a non-conductive elastic material.

15. The remote mechanical grasping apparatus according to claim 14, wherein said non-conductive elastic material is a rubber based material.

16. The remote mechanical grasping apparatus according to claim 1, wherein said claw assembly is made from a non-conductive material.

17. The remote mechanical grasping apparatus according to claim 16, wherein said non-conductive material is plastic.

18. The remote mechanical grasping apparatus according to claim 16, wherein said non-conductive material is a polymer.

19. The remote mechanical grasping apparatus according to claim 1, wherein said claw assembly is coated with a non-sparking material.

20. The remote mechanical grasping apparatus according to claim 1, wherein said locking sleeve assembly comprises a locking sleeve and a compression clamp coupled to said locking sleeve.

21. The remote mechanical grasping apparatus according to claim 1, wherein said claw control lever further comprises a locking switch.

22. The remote mechanical grasping apparatus according to claim 1, wherein said slidable locking sleeve assembly is positioned only around said first rod, and said second rod is positioned substantially parallel to said first rod.

23. The remote mechanical grasping apparatus according to claim 1, wherein said first and second rods are substantially co-axial.

24. The remote mechanical grasping apparatus according to claim 1, further comprising a retaining sleeve fixably coupled to said second rod, said retaining sleeve prevents said locking sleeve from sliding along the entire length of said second rod.

25. The remote mechanical grasping apparatus according to claim 1, further comprising a flashlight attachment connected to said second rod, and a flashlight removably connected to said flashlight attachment.

26. The remote mechanical grasping apparatus according to claim 1, further comprising a mirror attachment connected to said second rod or said claw assembly, and a mirror removably connected to said mirror attachment.

27. A remote mechanical grasping apparatus comprising:
   a first rod having a first end, a second end, and an interior channel extending therethrough;
   a second rod having a first end, a second end, an interior channel extending there through;
   a joint assembly comprising:
      a first joint fitting having a first end and a second end, said first end of said first joint fitting connected to said second end of said first rod;
      a joint rod having a first end and a second end, said first end of said joint rod is connected to said second end of said first joint fitting;
      a second joint fitting having a first end and a second end, said first end of said second joint fitting connected to said second end of said joint rod and said second end of said second joint fitting connected to said first end of said second rod; and
      an interior channel extending through said joint assembly, said interior channel of said joint assembly is in communication with said interior channel of said first rod and said interior channel of said second rod;
   a claw assembly pivotably connected to said second end of said second rod;
   a cable assembly mounted substantially adjacent to said first end of said first rod, said cable assembly comprising:
      a claw control lever; and
      an actuation cable extending through said interior cavity of each of said first rod, said joint assembly, and said second rod, said actuation cable is mechanically connected to said claw control lever and said claw assembly such that actuation of said claw control lever causes the actuation of said claw assembly; and
   a slidable locking sleeve assembly positioned around said first rod, said second rod, and said joint assembly.

28. The remote mechanical grasping apparatus according to claim 27, wherein said locking sleeve assembly comprises a locking sleeve and a compression clamp coupled to said locking sleeve.

29. The remote mechanical grasping apparatus according to claim 28, further comprising a retaining sleeve fixably coupled to said second rod, said retaining sleeve prevents said locking sleeve from sliding along the entire length of said second rod.

30. The remote mechanical grasping apparatus according to claim 27, wherein said claw control lever further comprises a locking switch.

31. A method for deploying a remote mechanical grasping apparatus comprising:
   providing said remote mechanical grasping apparatus, said remote mechanical grasping apparatus comprising:
      a first rod having a first end and a second end;
      a second rod having a first end and a second end, said second rod being substantially parallel to said first rod;
      a joint assembly connected to said second end of said first rod and to said first end of said second rod;
      a claw assembly pivotably connected to said second end of said second rod;
      a cable assembly mounted substantially adjacent to said first end of said first rod, said cable assembly comprising:
         a claw control lever; and
         an actuation cable, said actuation cable is mechanically connected to said claw control lever and said claw assembly such that actuation of said claw control lever causes the actuation of said claw assembly; and
      a slidable locking sleeve slidably coupled to said first rod, said slidable locking sleeve comprising:
         a locking sleeve having a threaded first end; and
         a compression clamp having a threaded interior that is adapted to engage with said threaded first end of said locking sleeve, said compression clamp being positioned between said locking sleeve and said first end of said first rod;
   pivoting said second rod until said second rod is substantially coaxial with said first rod;

sliding said locking sleeve over said joint assembly and said second rod such that said locking sleeve is positioned around said first rod, said joint assembly, and said second rod; and engaging said compression clamp with said locking sleeve thereby locking said first rod to said second rod.

32. The method according to claim 31, further comprising pivoting said claw assembly between about −90° to about 90° relative to said second rod.

33. The method according to claim 31, wherein said remote mechanical grasping apparatus further comprises a retaining sleeve fixably coupled to said second rod, said method further comprising preventing said locking sleeve from sliding along the entire length of said second rod with said retaining sleeve prior to engaging said compression clamp to said locking sleeve.

34. The method according to claim 31, wherein said remote mechanical grasping apparatus further comprises a flashlight attachment connected to said second rod, said method further comprising attaching a flashlight to said flashlight attachment.

35. The method according to claim 31, wherein said remote mechanical grasping apparatus further comprises a mirror attachment connected to said second rod or said claw assembly, said method further comprising attaching a mirror to said mirror attachment.

* * * * *